(12) United States Patent
Watanabe

(10) Patent No.: US 6,915,461 B1
(45) Date of Patent: Jul. 5, 2005

(54) CONTROL UNIT USED IN MACHINE TOOLS

(75) Inventor: Hiroko Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,115

(22) PCT Filed: Apr. 27, 1999

(86) PCT No.: PCT/JP99/02220
§ 371 (c)(1),
(2), (4) Date: Nov. 29, 2001

(87) PCT Pub. No.: WO00/65416
PCT Pub. Date: Nov. 2, 2000

(51) Int. Cl.$^7$ ............................................... G06F 11/00
(52) U.S. Cl. ......................................... 714/57; 717/125
(58) Field of Search ............................ 714/57; 717/125

(56) References Cited

U.S. PATENT DOCUMENTS

| | | | |
|---|---|---|---|
| 5,557,549 A | | 9/1996 | Chang |
| 5,892,898 A | * | 4/1999 | Fujii et al. ..................... 714/57 |
| 5,909,215 A | * | 6/1999 | Berstis et al. ................ 345/781 |
| 6,138,253 A | * | 10/2000 | Buzsaki ........................ 714/48 |
| 6,173,422 B1 | * | 1/2001 | Kimura et al. ................ 714/57 |
| 6,384,848 B1 | * | 5/2002 | Kojima et al. .............. 345/808 |
| 6,438,716 B1 | * | 8/2002 | Snover ......................... 714/57 |

FOREIGN PATENT DOCUMENTS

| | | |
|---|---|---|
| CN | 1086028 A | 4/1994 |
| JP | 63-58553 | 3/1988 |
| JP | 1-93840 | 4/1989 |
| JP | 2-121040 | 5/1990 |
| JP | 5-173844 | 7/1993 |
| JP | 6-274371 | 9/1994 |

OTHER PUBLICATIONS

RD 288010 A Apr. 1988.*

* cited by examiner

*Primary Examiner*—Scott Baderman
(74) *Attorney, Agent, or Firm*—Sughrue Mion, PLLC

(57) ABSTRACT

The control unit comprises a first display unit which, when an error occurs, displays a primary error message; an error information input unit by which an user inputs error information corresponding to the primary error message, a memory which stores the error information input using the error information input unit; and a second display unit which displays the error information.

2 Claims, 4 Drawing Sheets

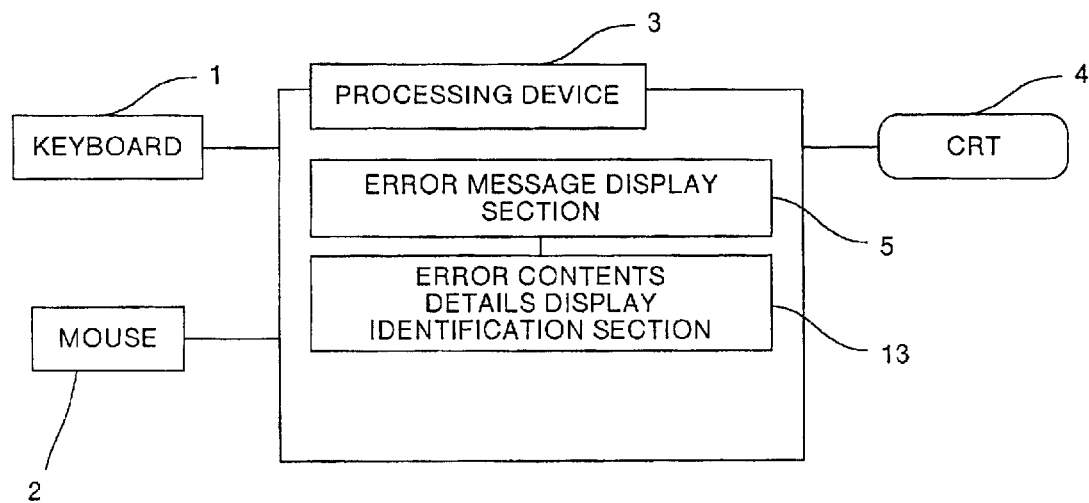
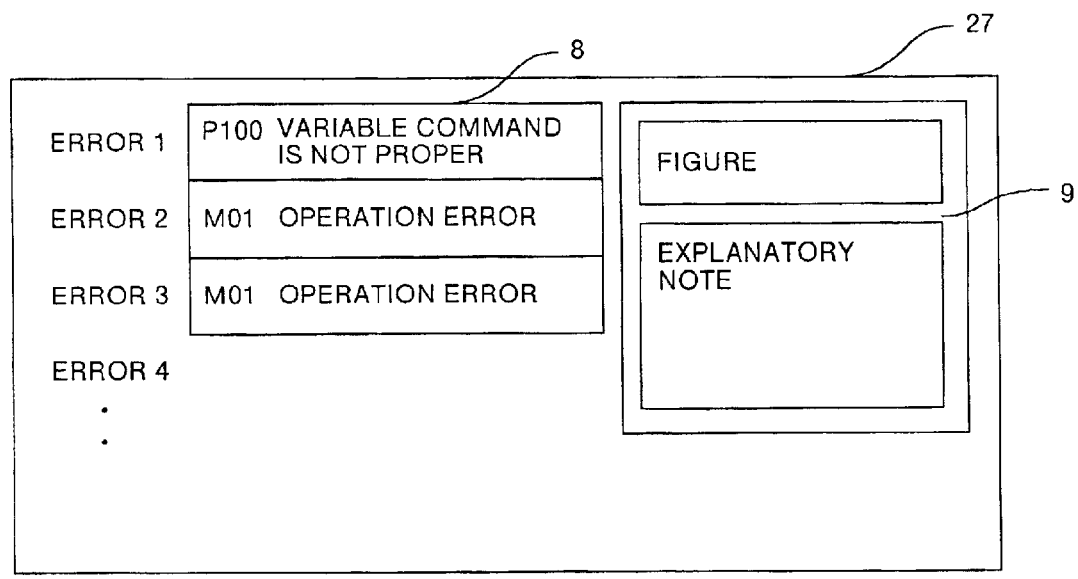

CONTROL UNIT USED IN MACHINE TOOLS

TECHNICAL FIELD

The present invention relates to a control unit, and more specifically, relates to a control unit used in machine tools.

BACKGROUND ART

A schematic block diagram of a conventional control unit is shown in FIG. 7. As shown in FIG. 7, in this control unit, reference numeral 1 denotes a keyboard for inputting data, 2 denotes a mouse for choosing a button on the screen, 3 denotes a processing unit for controlling each processing, 4 denotes a CRT which displays data, 5 denotes an error message display unit and 6 denotes an error contents detailed display unit.

The conventional control unit operates as follows. The control unit displays the error display screen 7 shown in FIG. 8. If an error occurs in a machine to be controlled, for example, in a machine tool such as a laser beam machine, a primary error message corresponding to this error is displayed on an error number/name display section 8, and detailed contents of the error are displayed in an error contents display section 9.

The primary error message, for example, may be a combination of an error number and an error name, determined in advance, corresponding to each error.

Moreover, when a plurality of errors occurs simultaneously, respective primary error messages, that is, the error numbers and the error names are displayed in a plurality of lines at the same time on the error number/name display section 8.

Thus, in case of the conventional control unit, when an error occurs, the error number and name, and detailed contents of the error stored beforehand corresponding to this error number are displayed. However, there are no means in the conventional control unit for an individual user to add and record peculiar error information, for example, an error corrective action or the like and display it again. Therefore, the user has to note the user specific error corrective action or the like on a sheet of paper, corresponding to the error, which is inconvenient. Moreover, a figure or an explanatory note is used as detailed description of errors, but there may be only an explanatory note without a figure, depending on the error. In this case, the size which displays the explanatory note is fixed, regardless of there being a figure or not, and in the case of displaying in a limited screen size, detailed contents cannot be displayed. Also, when a plurality of errors occurs at the same time, there is no mechanism for the user to select the error details.

The present invention has been made in order to solve the above-described problems. It is an object of the present invention to obtain a control unit that can correspond to various types of users, wherein at the time of occurrence of error, each user can deal with the error quickly and properly.

DISCLOSURE OF THE INVENTION

The present invention is to provide a control unit comprising a first display unit which, when an error occurs, displays a primary error message; an error information input unit by which an user inputs error information corresponding to the primary error message; a memory which stores the error information input using the error information input unit; and a second display unit which displays the error information.

Accordingly, since the user can input and store the error information to be added corresponding to the error contents, it becomes possible to store the user specific error corrective action, and provide precise error corrective action to a plurality of different users, and at the time of occurrence of error, quick and precise handling of error also becomes possible.

Particularly, in the case of a machine tool used in factories, etc., the same user (i.e. operator) may not always handles the machine tool, and in many cases, other users operate the machine tool, and since the error handling contents handled before is displayed, even if another user handles the error, efficient handling becomes possible.

Moreover, the present invention provides a control unit wherein, as the input of the error handling information, error information to be added is input and edited in a text box on the error display screen, using a mouse or a keyboard.

Therefore, since not only the primary error message, for example, an error number and an error name, but also minimum error contents stored beforehand are displayed, it becomes easy for a user to understand the contents of the error.

Moreover, the present invention provides a control unit comprising a first display unit which, when an error occurs, displays a primary error message; and a second display unit which displays error contents corresponding to the primary error message, wherein the second display unit judges whether there is a figure related to the error, and when there is a related figure, displays the figure and an explanatory note, and when there is no related figure, displays only the explanatory note.

Accordingly, since precise display is given as detailed contents of the error, with respect to each case corresponding to the existence of a figure and an explanatory note, efficient display related to the error becomes possible even in a limited screen size. Particularly, with the control unit of a machine tool, there are many cases where the screen size is small due to the space and the cost. Hence, according to the present invention, information can be displayed effectively even on a small screen.

Moreover, the present invention provides a control unit comprising a display unit which displays a primary error message, when an error occurs, and a selection unit which displays error contents corresponding to the primary error message, by which a user can select error contents to be confirmed, when a plurality of errors occurs at the same time.

Accordingly, when a plurality of errors occurs at the same time, details of an error to be given priority can be selected. Hence, the error can be handled efficiently within a short period of time, thereby enabling reduction of loss time.

BRIEF DESCRIPTION OF THE DRAWINGS

FIG. 3 is a schematic block diagram of a control unit according to a second embodiment of the present invention;

FIG. 4 is a diagram showing an error display screen of the control unit according to the second embodiment of the present invention;

BEST MODE FOR CARRYING OUT THE INVENTION

Figure 1:
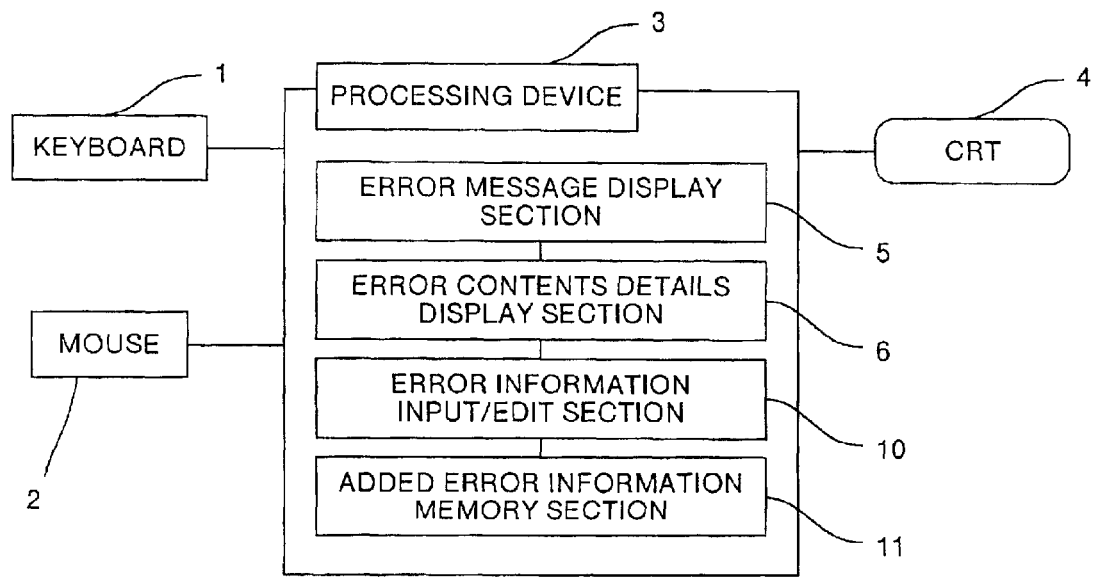
FIG. 1 is a schematic block diagram of a control unit according to a first embodiment of the present invention.
Figure 2:
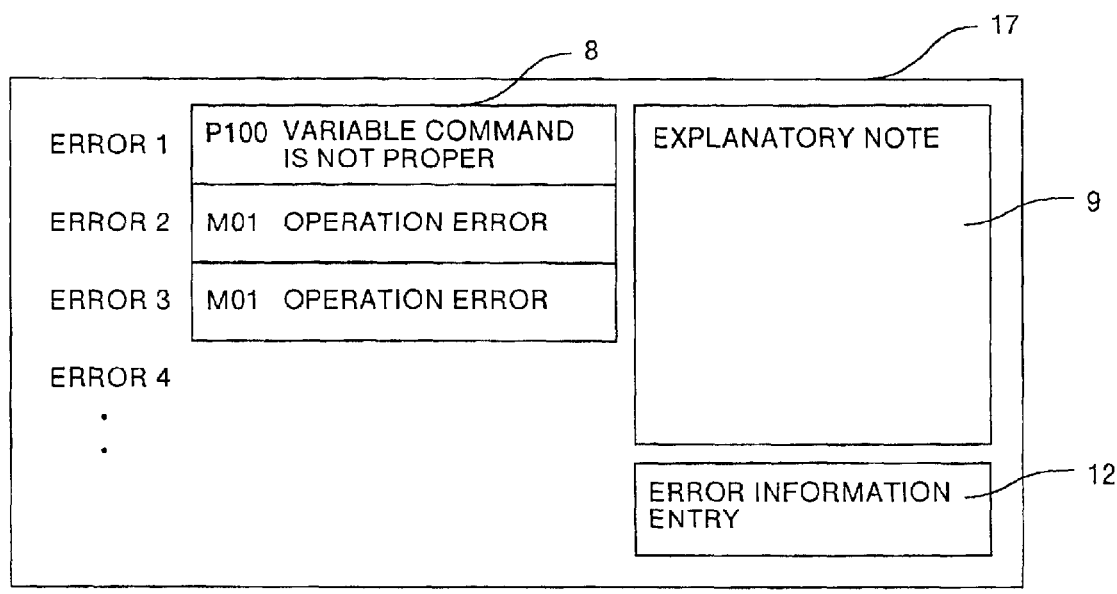
FIG. 2 is a diagram showing an error display screen of the control unit according to the first embodiment of the present invention.

First Embodiment:

A control unit according to the first embodiment of the present invention will now be described with reference to FIG. 1 and FIG. 2. FIG. 1 is a schematic block diagram of the control unit according to this embodiment, and FIG. 2 is a diagram showing an error display screen 17.

When an error occurs in a machine to be controlled (for example, a laser beam machine), an error number and an error name, being a primary error message corresponding to this error, are displayed in an error number/name display section 8 on the error display screen 17 by the error message display section 5. When a plurality of errors occurs at the same time, a plurality of errors are displayed in a plurality of lines at the same time. The error contents detailed display section 6 displays detailed contents of the error corresponding to the error number are displayed in the error contents display area 9. When a plurality of errors occurs at the same time, detailed contents of the error corresponding to the error number displayed at the head are displayed. Moreover, a text box in which error information to be added, corresponding to the error contents now being displayed, can be input is displayed in the error information entry/display area 12.

By the function of an error information input/edit section 10, the error information can be input and edited, by selecting the text box with the mouse 2, and using the keyboard 1. The input error information is stored in the added error information memory section 11, and is displayed when a similar error occurs next time.

Second Embodiment:

A control unit according to the second embodiment of the present invention will now be described with reference to FIG. 3 and FIG. 4. FIG. 3 is a schematic block diagram of the control unit according to this embodiment, and FIG. 4 is a diagram showing the error display screen 27.

When an error occurs, the error message display section 5 displays the error number and the error name corresponding to this error are in the error number/name display area 8 on the error display screen 27. When a plurality of errors occurs at the same time, a plurality of errors are displayed in a plurality of lines at the same time. The error contents detailed display identification section 13 judges whether or not there is a figure or an explanatory note corresponding to the error number. When it is judged, that there are both the figure and the explanatory note, these are displayed in an error contents display section 9. On the contrary, when it is judged, that there is only the explanatory note, the explanatory note is displayed in the error contents display section 9.

Figure 5:
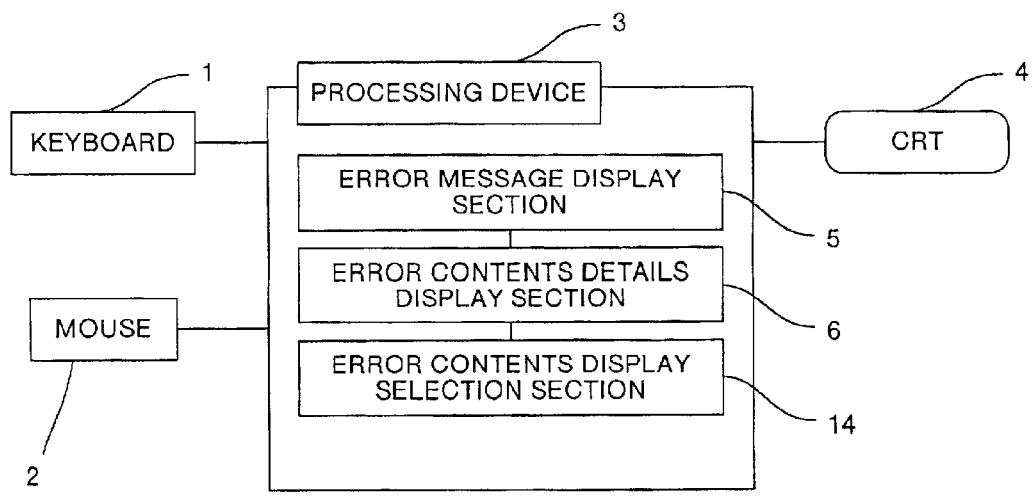
FIG. 5 is a schematic block diagram of a control unit according to a third embodiment of the present invention.
Figure 6:
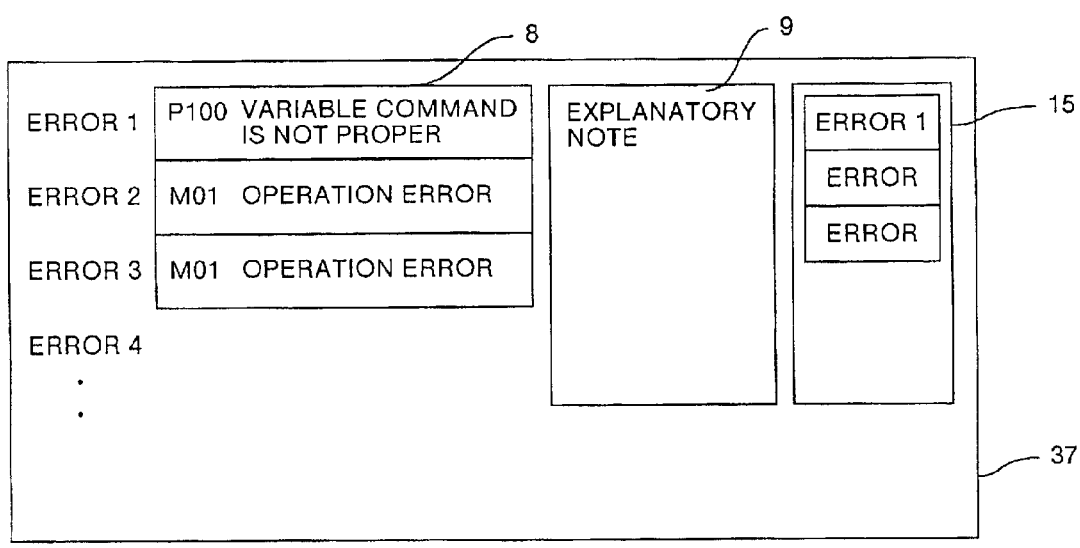
FIG. 6 is a diagram showing an error display screen of the control unit according to the third embodiment of the present invention.
Figure 7:
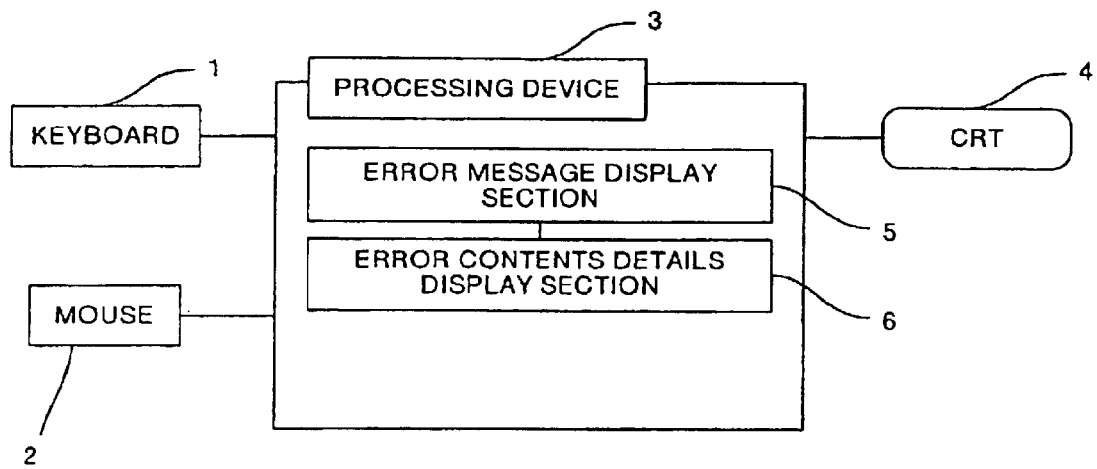
FIG. 7 is a schematic diagram showing a conventional control unit.
Figure 8:
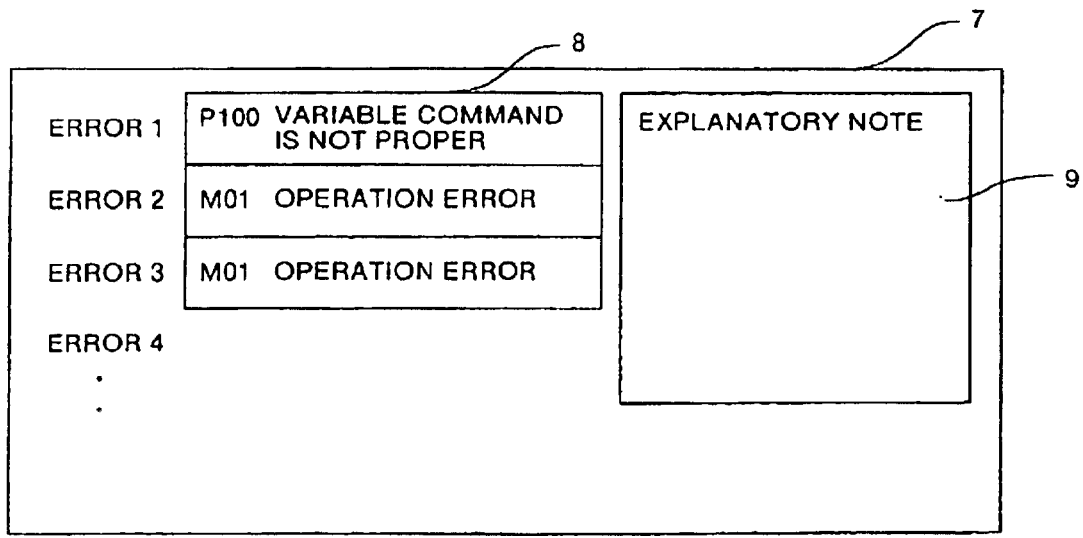
FIG. 8 is a diagram showing an error display screen of the conventional control unit.

Third Embodiment:

A control unit according to the third embodiment of the present invention will now be described with reference to FIG. 5 and FIG. 6. FIG. 5 is a schematic block diagram of the control unit according to this embodiment, and FIG. 6 is a diagram showing the error display screen 37.

When an error occurs, the error message display section 5 displays the error number and the error name corresponding to this error in the error number/name display area 8 on the error display screen 37. When a plurality of errors occurs at the same time, a plurality of errors are displayed in a plurality of lines at the same time. The error contents detailed display section 6 displays detailed contents of the error corresponding to the error number in the error contents display area 9. When a plurality of errors occurs at the same time, detailed contents of the error corresponding to the error number displayed at the head are displayed. In this case, a selection key corresponding to the error to be selected among the error contents selection keys 15 on the error display screen 37 is selected using the mouse 2. The error contents display selection section 14 displays detailed contents of the selected error in the error contents display area 9.

Fourth Embodiment:

In the above description, a control unit having a function that can input error information related to the error contents, one having a function of displaying when there is an explanatory note related to the error, and one having a function of displaying detailed information by selecting a specific error, when a plurality of errors occurs at the same time have been described separately. However, it is a matter of course that a control unit including all these three functions may be constructed.

INDUSTRIAL APPLICABILITY

As described above, the control unit according to the present invention is suitable for being used in machine tools such as a laser beam machine.

What is claimed is:

1. A control unit for a mechanical tool comprising:
   a first display unit which, when an error occurs, displays a primary error message which has been stored and corresponds to the error on an error display screen;
   an error information input unit by which, when said error occurs, a user inputs additional error information corresponding to the primary error message;
   a memory which stores the additional error information input by the error information input unit, and
   a second display unit which displays on the error display screen the additional error information stored in the memory when a similar error occurs next time.

2. The control unit for the mechanical tool according to claim 1, wherein the additional error information is input and edited in a text box on the error display screen, using a mouse or a keyboard.

\* \* \* \* \*